(12) United States Patent
Subramanian et al.

(10) Patent No.: US 8,346,691 B1
(45) Date of Patent: Jan. 1, 2013

(54) COMPUTER-IMPLEMENTED SEMI-SUPERVISED LEARNING SYSTEMS AND METHODS

(75) Inventors: Revathi Subramanian, San Diego, CA (US); Vijay S. Desai, San Diego, CA (US); Hongrui Gong, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 825 days.

(21) Appl. No.: 11/850,861

(22) Filed: Sep. 6, 2007

Related U.S. Application Data

(60) Provisional application No. 60/902,380, filed on Feb. 20, 2007.

(51) Int. Cl.
*G06F 15/18* (2006.01)
(52) U.S. Cl. ............................................ 706/15; 706/12
(58) Field of Classification Search .................... 706/15, 706/12
See application file for complete search history.

(56) References Cited

U.S. PATENT DOCUMENTS

| | | | |
|---|---|---|---|
| 5,335,291 A | 8/1994 | Kramer et al. |
| 5,500,513 A | 3/1996 | Langhans et al. |
| 5,519,319 A | 5/1996 | Smith et al. |
| 5,650,722 A | 7/1997 | Smith et al. |
| 5,675,253 A | 10/1997 | Smith et al. |
| 5,677,955 A | 10/1997 | Doggett et al. |
| 5,761,442 A | 6/1998 | Barr et al. |
| 5,884,289 A | 3/1999 | Anderson et al. |
| 5,903,830 A | 5/1999 | Joao et al. |
| 5,999,596 A | 12/1999 | Walker et al. |
| 6,021,943 A | 2/2000 | Chastain |
| 6,029,154 A | 2/2000 | Pettitt |
| 6,047,268 A | 4/2000 | Bartoli et al. |
| 6,064,990 A | 5/2000 | Goldsmith |
| 6,122,624 A | 9/2000 | Tetro et al. |
| 6,125,349 A | 9/2000 | Maher |
| 6,128,602 A | 10/2000 | Northington et al. |
| 6,170,744 B1 | 1/2001 | Lee et al. |
| 6,330,546 B1 | 12/2001 | Gopinathan et al. |
| 6,422,462 B1 | 7/2002 | Cohen |
| 6,453,206 B1 | 9/2002 | Soraghan et al. |
| 6,516,056 B1 | 2/2003 | Justice et al. |
| 6,549,861 B1 | 4/2003 | Mark et al. |
| 6,601,049 B1 | 7/2003 | Cooper |
| 6,631,212 B1 | 10/2003 | Luo et al. |
| 6,650,779 B2 | 11/2003 | Vachtesvanos et al. |

(Continued)

OTHER PUBLICATIONS

West et al ("Neural network ensemble strategies for financial decision application" May 2004).*

(Continued)

*Primary Examiner* — Lut Wong
(74) *Attorney, Agent, or Firm* — Jones Day

(57) ABSTRACT

Computer-implemented systems and methods for determining a subset of unknown targets to investigate. For example, a method can be configured to receive a target data set, wherein the target data set includes known targets and unknown targets. A supervised model such as a neural network model is generated using the known targets. The unknown targets are used with the neural network model to generate values for the unknown targets. Analysis with an unsupervised model is performed using the target data set in order to determine which of the unknown targets are outliers. A comparison of list of outlier unknown targets is performed with the values for the unknown targets that were generated by the neural network model. The subset of unknown targets to investigate is determined based upon the comparison.

13 Claims, 14 Drawing Sheets

U.S. PATENT DOCUMENTS

| | | | |
|---|---|---|---|
| 6,675,145 | B1 | 1/2004 | Yehia et al. |
| 6,678,640 | B2 | 1/2004 | Ishida et al. |
| 7,117,191 | B2 | 10/2006 | Gavan et al. |
| 7,191,150 | B1 | 3/2007 | Shao et al. |
| 7,269,516 | B2 | 9/2007 | Brunner et al. |
| 7,403,922 | B1 | 7/2008 | Lewis et al. |
| 7,455,226 | B1 | 11/2008 | Hammond et al. |
| 7,461,048 | B2 | 12/2008 | Teverovskiy et al. |
| 7,467,119 | B2 | 12/2008 | Saidi et al. |
| 7,480,640 | B1 | 1/2009 | Elad et al. |
| 7,536,348 | B2 | 5/2009 | Shao et al. |
| 7,562,058 | B2 | 7/2009 | Pinto et al. |
| 7,580,798 | B2 | 8/2009 | Brunner et al. |
| 7,761,379 | B2 | 7/2010 | Zoldi et al. |
| 7,765,148 | B2 | 7/2010 | German et al. |
| 2002/0099635 | A1 | 7/2002 | Guiragosian |
| 2002/0138417 | A1 | 9/2002 | Lawrence |
| 2002/0194119 | A1 | 12/2002 | Wright et al. |
| 2003/0093366 | A1 | 5/2003 | Halper et al. |
| 2003/0097330 | A1 | 5/2003 | Hillmer et al. |
| 2004/0039688 | A1 | 2/2004 | Sulkowski et al. |
| 2005/0055373 | A1 | 3/2005 | Forman |
| 2006/0020814 | A1 | 1/2006 | Lieblich et al. |
| 2006/0181411 | A1 | 8/2006 | Fast et al. |
| 2007/0192167 | A1 | 8/2007 | Lei et al. |
| 2008/0134236 | A1 | 6/2008 | Iijima et al. |

OTHER PUBLICATIONS

Gabrys et al ("Combining labeled and unlabelled data in the design of pattern classification systems" 2003).*

Hawkins et al ("Outlier Detection Using Replicator Neural Networks" 2002.*

Simon Gunter ("Multiple Classifier Systems in Offline Cursive Handwriting Recognition" 2004) only cover and p. 4 are included. Total of 2 pages.*

Ziaojin Zhu ("Semi-Supervised Learning with Graphs", May 2005).*

Hodge et al ("A survey of Outlier detection methodologies" 2004).*

Brause, Rudiger W., "Cascaded Vector Quantization by Non-Linear PCA Network Layers", IEEE, pp. 154-160 (1994).

Chan, Lipchen Alex et al., "Automatic target detection using dualband infrared imager", Acoustics, Speech, and Signal PICASSP'00. Proceedings, 2000 IEEE International Conference, pp. 2286-2289 (Jun. 9, 2000).

Chatterjee, Chanchal et al., "Self-Organizing Algorithms for Generalized Eigen-Decomposition", IEEE Transactions on Neural Networks, vol. 8, No. 6, pp. 1518-1530 (Nov. 1997).

Chen, Yupeng et al., "High Resolution Adaptive Bearing Estimation Using A Complex-Weighted Neural Network", IEEE, 0-7803-0532-9/92, pp. II-317-IIII-320 (1992).

Mehrotra, Kishan et al., "Elements of Artificial Neural Networks", MIT Press, pp. 11, 25, 71 76, 85-87, 157, 170-171 (1997).

Wong, A.S.Y. et al., "A Unified Sequential Method for PCA", IEEE, pp. 583-586 (1999).

Tsai, Chieh-Yuan, et al., "A Dynamic Web Service based Data Mining Process System", Proceedings of the 2005 The Fifth International Conference on Computer and Information Technology, pp. 1033-1039 (2005).

* cited by examiner

COMPUTER-IMPLEMENTED SEMI-SUPERVISED LEARNING SYSTEMS AND METHODS

CROSS-REFERENCE TO RELATED APPLICATIONS

This application claims priority to and the benefit of U.S. Application Ser. No. 60/902,380, (entitled "Computer-Implemented Semi-supervised Learning Systems And Methods" and filed on Feb. 20, 2007), of which the entire disclosure (including any and all figures) is incorporated herein by reference.

This application contains subject matter that may be considered related to subject matter disclosed in: U.S. Application Ser. No. 60/902,378, (entitled "Computer-Implemented Modeling Systems and Methods for analyzing Computer Network Intrusions" and filed on Feb. 20, 2007); U.S. Application Ser. No. 60/902,379, (entitled "Computer-Implemented Systems and Methods For Action Determination" and filed on Feb. 20, 2007); U.S. Application Ser. No. 60/902,381, (entitled "Computer-Implemented Guided Learning Systems and Methods for Constructing Predictive Models" and filed on Feb. 20, 2007); U.S. Application Ser. No. 60/786,039 (entitled "Computer-Implemented Predictive Model Generation Systems And Methods" and filed on Mar. 24, 2006); U.S. Application Ser. No. 60/786,038 (entitled "Computer-Implemented Data Storage For Predictive Model Systems" and filed on Mar. 24, 2006); and to U.S. Provisional Application Ser. No. 60/786,040 (entitled "Computer-Implemented Predictive Model Scoring Systems And Methods" and filed on Mar. 24, 2006); of which the entire disclosures (including any and all figures) of all of these applications are incorporated herein by reference.

TECHNICAL FIELD

This document relates generally to constructing and using computer predictive models and more particularly to using semi-supervised learning systems and methods for generating predictive models.

BACKGROUND

Computer predictive models have found applicability in many diverse areas. However, difficulty arises in using predictive models when the training targets are not fully known. A non-limiting example where predictive models encounter unknown targets is when predictive models are to assess whether fraud may have occurred with respect to monetary-related transactions. Current predictive model approaches have difficulty in discerning legitimate monetary-related transactions from fraudulent ones.

SUMMARY

In accordance with the teachings provided herein, systems and methods for operation upon data processing devices are provided for performing semi-supervised learning. For example, a method and system can be configured to receive a target data set, wherein the target data set includes known targets and unknown targets. A supervised model such as a neural network model is generated using the known targets. The unknown targets are used with the neural network model to generate values for the unknown targets. Analysis with an unsupervised model (e.g., using an approach such as outlier detection analysis) is performed using the target data set in order to determine which of the unknown targets are outliers. A comparison of the list of outlier unknown targets is performed with the values for the unknown targets that were generated by the neural network model. The subset of unknown targets to investigate is determined based upon the comparison.

DETAILED DESCRIPTION

Figure 1:
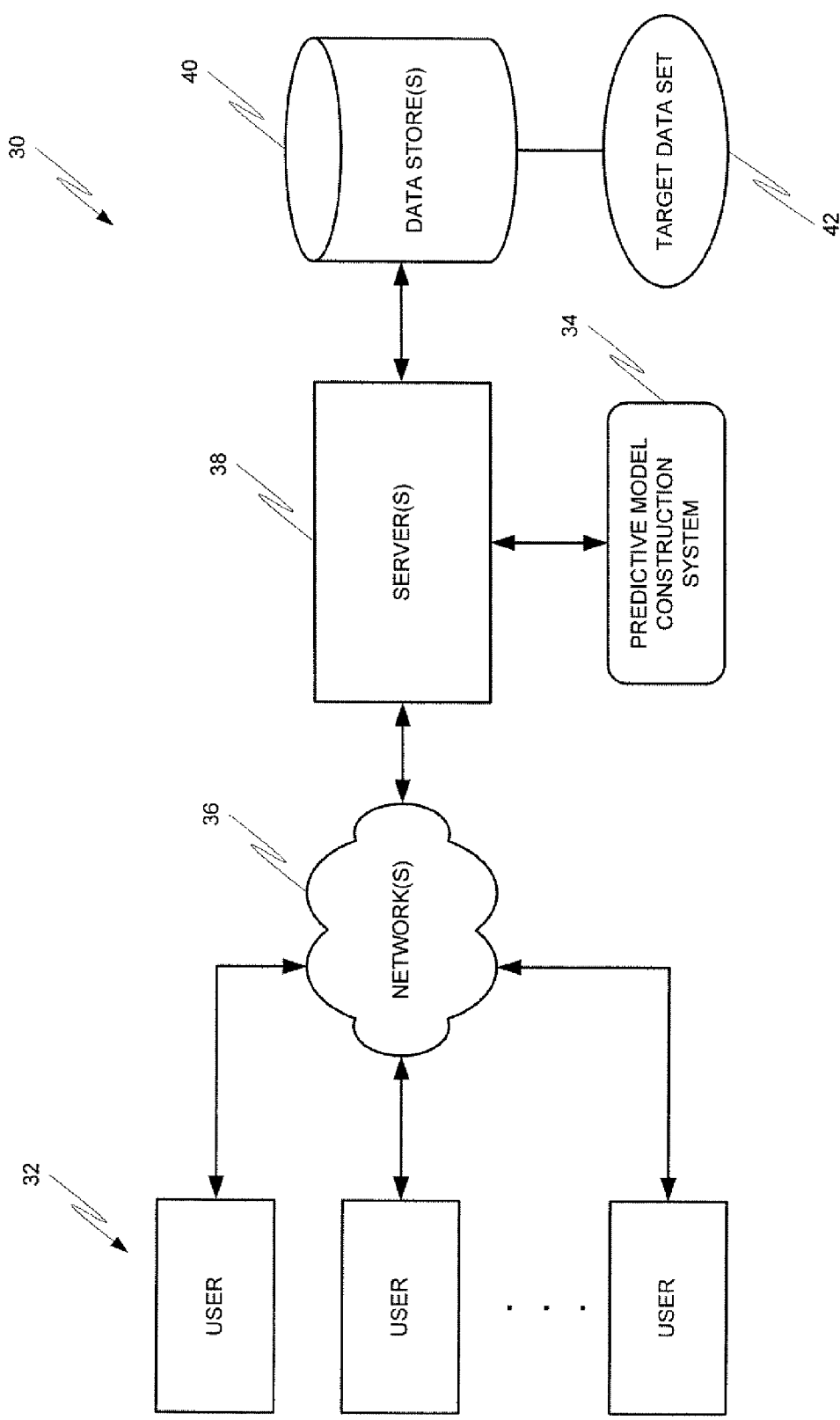
FIG. 1 is a block diagram depicting a computer-implemented system for constructing predictive models.

FIG. 1 depicts at 30 a computer networked environment wherein users 32 can interact with a predictive model construction system 34. System 34 allows the users 32 to build predictive models even when targets 42 of the modeling process are only partially known. This can be useful in many different situations, such as in semi-supervised learning situations.

Semi-supervised situations involve generation of predictive models typically (but not always) by means of a small amount of labeled data and a large amount of unlabeled data (e.g., collectively target data set 42). Semi-supervised situations can arise because the cost associated with the labeling process may render a fully labeled training set impractical, whereas acquisition of unlabeled data is relatively inexpensive. In such situations, semi-supervised learning can be of great practical value.

The users 32 can interact with the predictive model construction system 34 through a number of ways, such as over one or more networks 36. A server 38 accessible through the network(s) 36 can host the predictive model construction system 34. Data store(s) 40 can store the data to be analyzed (e.g., target data set 42) as well as any intermediate or final data calculations and data results.

The predictive model construction system 34 can be a web-based tool that provides users with flexibility and functionality for generating predictive models when the targets 42 are only partially known. Moreover, the predictive model construction system 34 can be used separately or in conjunction with other software programs, such as with other predictive model construction techniques.

Figure 2:
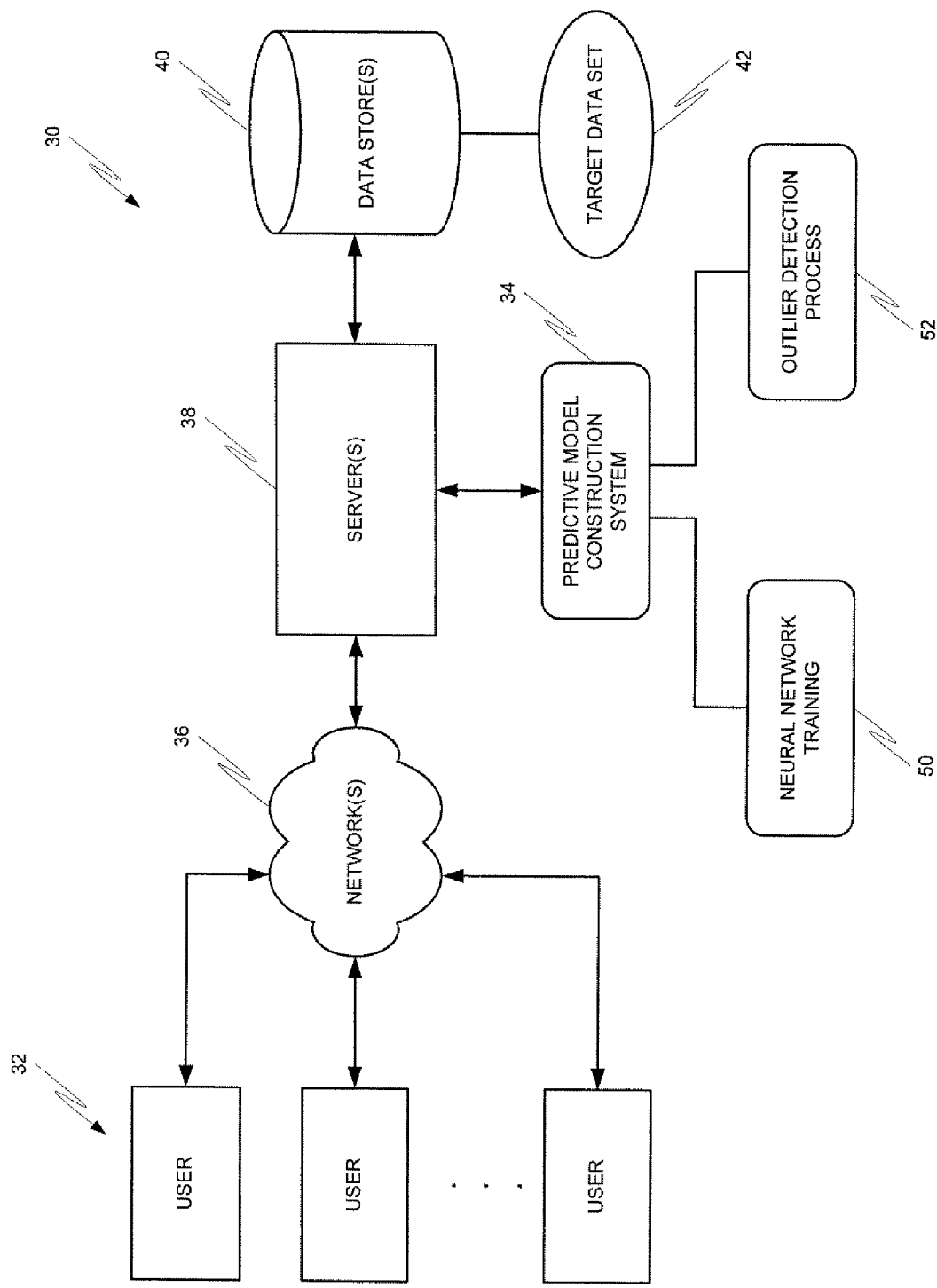
FIG. 2 is a block diagram depicting neural network training combined with an outlier detection process.

With reference to FIG. 2, neural network training 50 combined with an outlier detection process 52 allow for the identification of which targets in the target data set 42 should be focused upon in order to ascertain the true (or at least a more accurate) value of the targets. The increased knowledge for some of the targets results in an evolution in the fidelity of the model's or models' predictive capability. More specifically, model training evolves from a state where the targets are partially known to a state where at least more of the targets have been identified.

Figure 3:
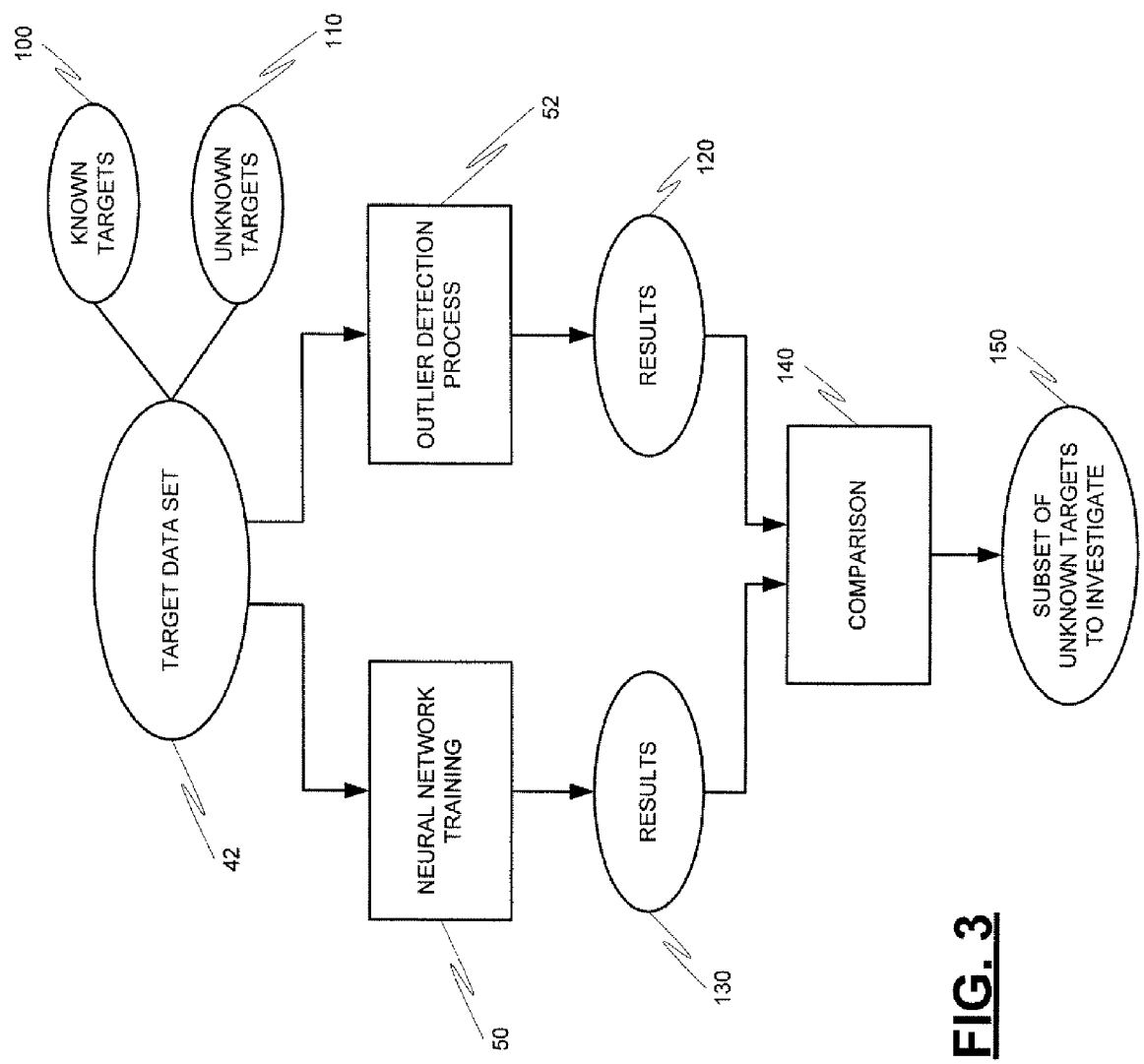
FIG. 3 is a process flow diagram depicting predictive model construction and use.

FIG. 3 illustrates a process flow by which predictive model construction can be performed using the target data set 42. As discussed above, the target data set 42 contains only a partial set of known targets (e.g., known targets 100 and unknown targets 110). As an example of one of the uses, the process flow can help in determining which of the potentially many unknown targets should be focused upon in order to determine the true values for these unknown targets.

Process 50 constructs models for predicting target values for the entries contained in the target data set 42. Many different types of predictive models can be constructed, such as artificial neural network predictive models. An artificial neural network is constructed of interconnecting neurons designed to model the target(s) and which changes its structure based on how it is trained, such as through the training process 50. More specifically, neural networks are non-linear statistical data modeling tools. They can be used to model complex relationships between inputs and targets or to find patterns in data.

The training process 50 begins with a set of interconnected nodes and alters the strength (e.g., weights) of the connections in the network to produce outputs. The training process 50 is provided with the input data about the target data set 42 and a cost function to be minimized. The cost function can be any function of the target values and predicted target values from the model under construction, such as the norm of the difference between the predicted and original target values. With the input data and the cost function, process 50 generates a neural network model using the known targets 100 (or at least a portion of the known targets 100). The unknown targets 110 (or at least a portion of the unknown targets 110) are used with the generated neural network model to generate values (i.e., results 130) for the unknown targets 110.

An outlier detection process 52 is performed using the target data set 42 for determining which of the unknown targets 110 are outliers. An unknown target being identified as an outlier by process 52 is an indication of anomalous activity, such as the possibility that fraud may have occurred.

In training process 52, both the input data set and the output data set are the target data set 42. The learning process tries to reproduce the input data as the target. Let the vector $x=(x_1, x_2, \ldots x_p)^T$ represent an observation with p inputs to the unsupervised learning process with a mean $\mu$ and covariance $\Sigma$. Let the vector $y=(y_1, y_2, \ldots, y_p)^T$ represent the same observation with p outputs from the unsupervised learning process. The cost function can be any function of the input data and target output of the model under construction—such as in this example, the Mahalanobis distance between the inputs and outputs which is defined as $\sqrt{(x-y)^T\Sigma^{-1}(x-y)}$. The difference between the inputs and outputs is also defined as the reconstruction error of the unsupervised learning process and can be represented as $E=(x-y)$. The Mahalanobis distance based reconstruction error can thus be defined as $\sqrt{E^T\Sigma^{-1}E}$. The covariance matrix can be expressed in terms of eigenvalue matrix $\Lambda$ and eigenvector $U_{as}\Sigma=U\Lambda U^T$. Therefore, $\sqrt{E^T\Sigma^{-1}E}$ can be computed from $\sqrt{(EU)^T\Lambda^{-1}(EU)}$. $\Sigma$ can be noisy. The computation of the reconstruction error can be done by using the first m eigenvalues $\Lambda$ of the covariance matrix $\Sigma$. An alternate approach is to use the first m eigenvalues and a small value for the remaining eigenvalues. A more general approach could be to weight the different eigenvalues differently in computing the reconstruction error. The inputs with the highest reconstruction error are deemed to be anomalous inputs.

Process 140 performs a comparison between the list of unknown targets (that have been identified as outliers) and the values 130 for the unknown targets that were generated by the neural network model. The subset 150 of unknown targets to investigate is determined based upon the comparison by process 140.

Figure 4:
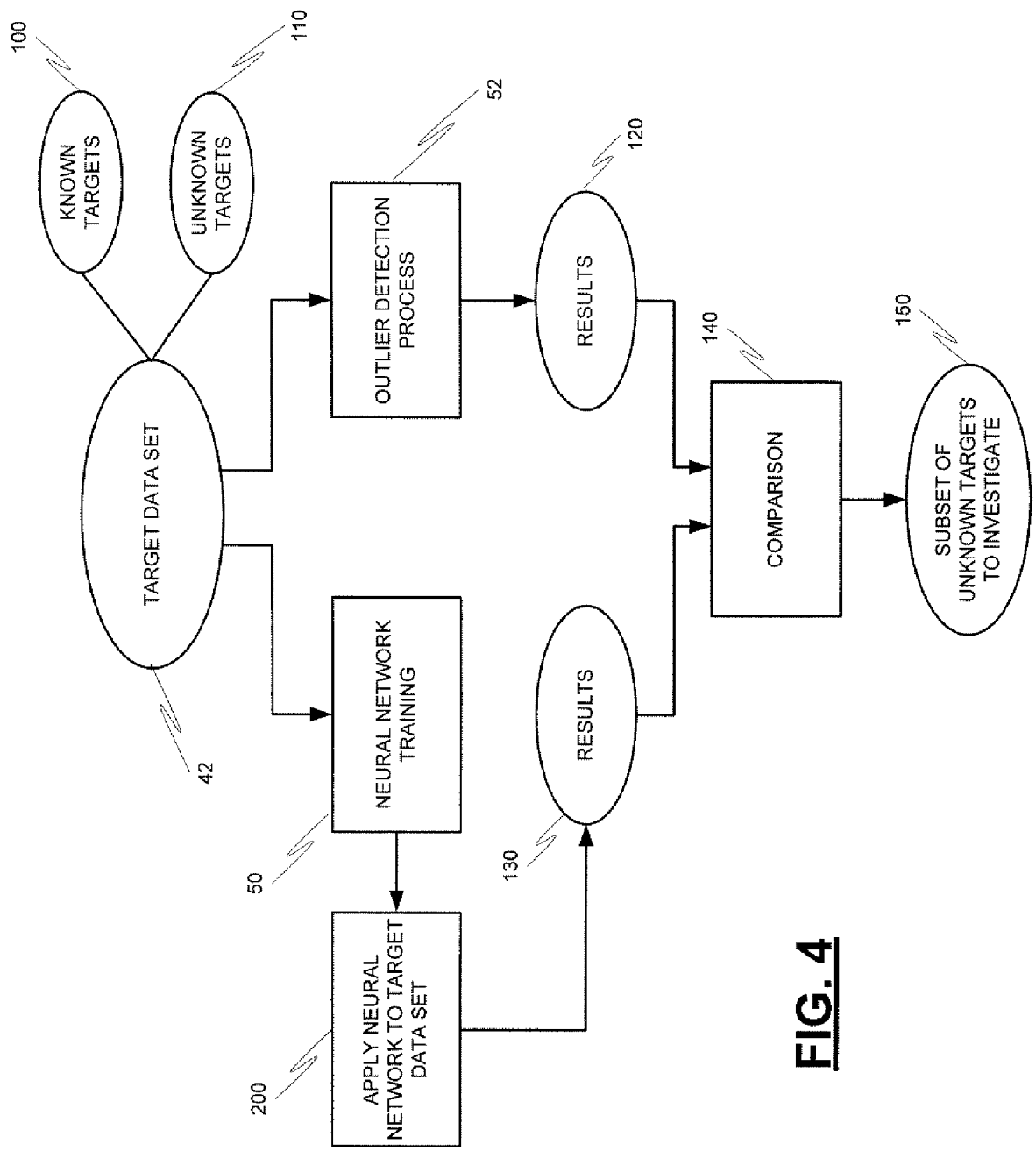
FIG. 4 is a process flow diagram depicting application of a neural network to generate scores.
Figure 5:
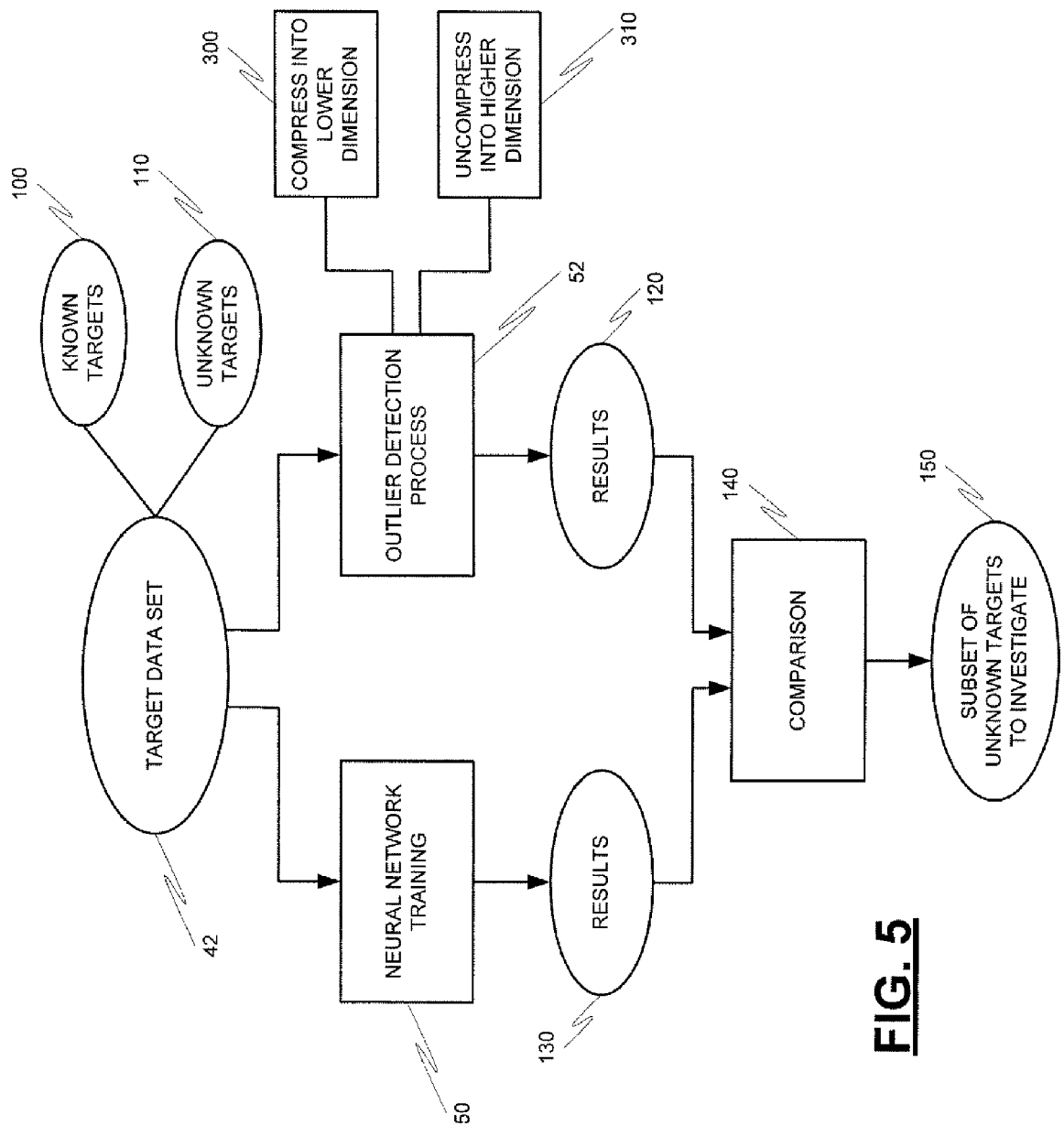
FIGS. 5 and 6 are process flow diagrams depicting techniques for performing outlier detection.

FIGS. 4 and 5 provide additional details respectively for the neural network training process 50 and the outlier detection process 52. With reference to FIG. 4, results 130 are generated when the neural network is applied at process 200 to the unknown target data set 110. For example, if the neural network is to detect whether fraud has occurred with respect to a financial or monetary transaction, then process 200 can generate target value scores for the unknown target data set 110 as the results 130 of the neural network.

The scores of the neural network model can assume a number of different formats. As an illustration, the scores can be binary in nature (e.g., a value of 1 to indicate that a transaction constitutes fraud; and a value of 0 to indicate that fraud has not occurred). The scores could also encompass a range of values. For example, a continuous range from 0-100 can indicate the degree by which an item in the target data set 42 can be considered fraudulent, wherein a value of 0 can establish the lower end of the fraud spectrum (i.e., not a fraud event) and a value of 100 can establish the upper end of the fraud spectrum.

FIG. 5 illustrates that the outlier detection process 52 can detect whether an unknown target should be considered an outlier with respect to the other unknown targets by performing processes 300 and 310. Process 300 compresses the data related to the unknown targets 110 by reducing the multi-dimensional data set to a lower dimension. Process 310 then reverses the compression process by expanding the data set from the lower dimension back to a higher dimension. Outliers can then be detected based upon how the data set performed during the compression and uncompression processes 300 and 310.

Figure 6:
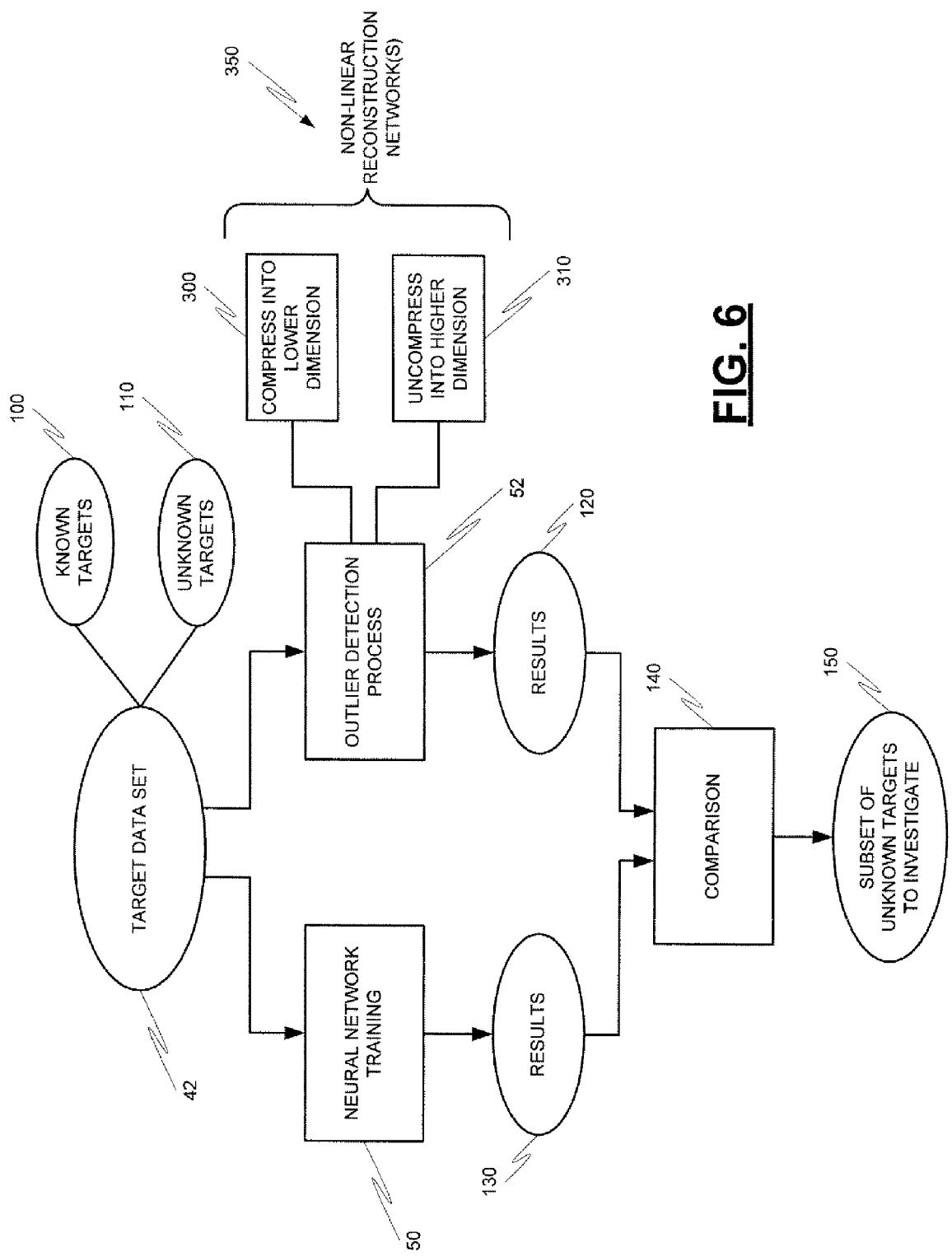

Different techniques are available in order to perform the compression and uncompression processes 300 and 310 such as by using nonlinear replicator neural networks (e.g., autoregressive neural networks, etc.) as shown at 350 in FIG. 6. Non-linear replicator neural networks are generally known in the art and discussed in such references as: S. Hawkins, H. X. He, G. J. Williams, and R. A. Baxter "Outlier detection using replicator neural networks," Proceedings of the Fifth International Conference and Data Warehousing and Knowledge Discovery 2002; G. J. Williams, R. A. Baxter, H. X. He, S. Hawkins, and L. Gu "A comparative study of RNN for outlier detection in data mining," Proceedings of the 2002 IEEE International Conference on Data Mining; and O. Abdel-Wahhab and M. Fahmy, "Image compression using multilayer neural networks," Proceedings of the 2nd IEEE Symposium on Computers and Communications (ISCC 1997).

Figure 7:
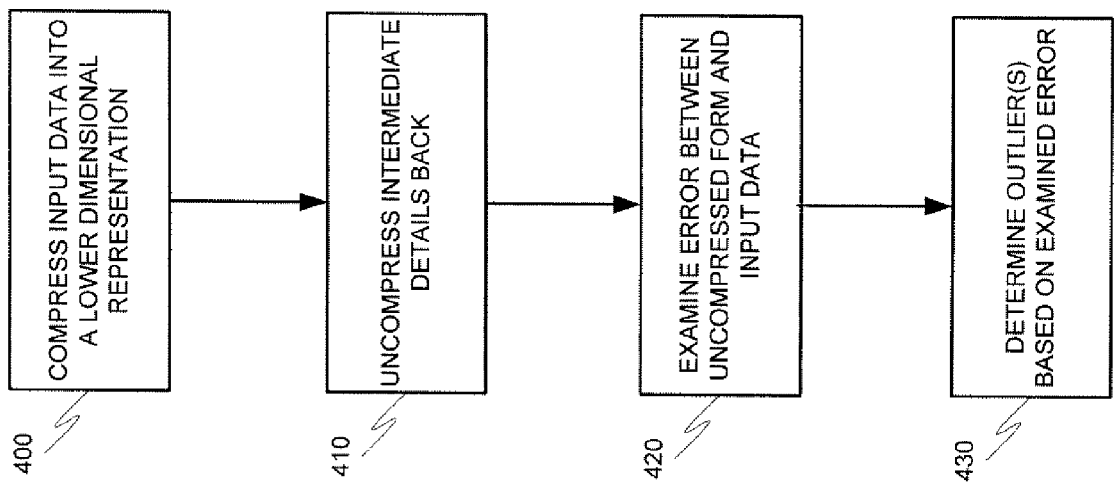
FIG. 7 is a flowchart depicting an operational scenario for using a non-linear replicator neural network (e.g., a compression neural network) in determining outliers.

FIG. 7 depicts an operational scenario for using a nonlinear replicator neural network in determining outliers based upon an input set of unknown targets. With reference to FIG. 7, a nonlinear replicator neural network compresses at step 400 the input unknown target data into a lower dimensional representation. Step 410 reverses the process by uncompressing the intermediate details back into the original dimensional representation. Step 420 examines the error that may have occurred between the uncompressed form and input data. The error is greater for those target values that had difficulty in being compressed into the lower dimensional representation. Target outliers are determined based upon the amount of target error that was determined in step 420.

Figure 8:
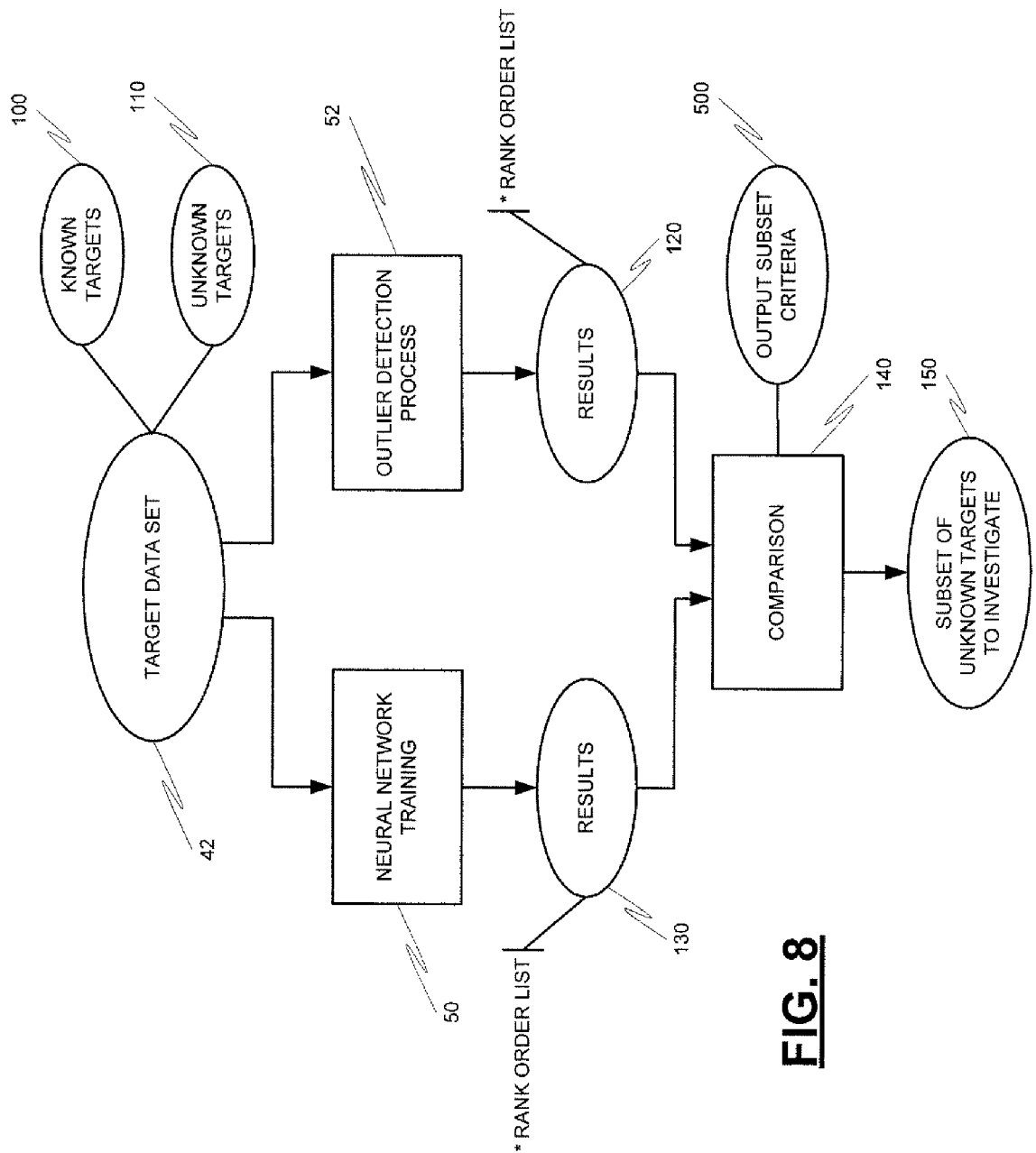
FIG. 8 is a process flow diagram depicting generation of a rank order list from an outlier detection process.

As shown in FIG. 8, the results 120 of the outlier detection process 52 can be a rank order list. The rank order list contains the unknown targets (that were determined to be outliers) in an order dictated by the error amount that they exhibited from the compression and uncompression processes. In other words, the unknown targets that exhibited the greatest amount of error would be ranked higher in the outlier list than the unknown targets that did not exhibit as much error. The results 130 of the neural network training process 50 can also be a rank order list format.

Process 140 compares the results 130 (e.g., the unknown target scores) from the neural network with the rank order list from the outlier detection process 52. The comparison process 140 can use output subset criteria 500 in determining which of the unknown targets should be included in the subset 150 of unknown targets to investigate. As an example, the output subset criteria 500 can specify that the subset 150 should include only those unknown targets that have a relatively high score as determined by the neural network model as well as those that were highly ranked as outliers by the outlier detection process. The combination of the analyses performed by the neural network and by the outlier detection process enhances the fidelity of the selection of which of the unknown targets constitutes anomalous behavior. It should be understood that many different types of criteria can be used in order to determine the subset of unknown targets to investigate and should be based upon the application at hand.

Figure 9:
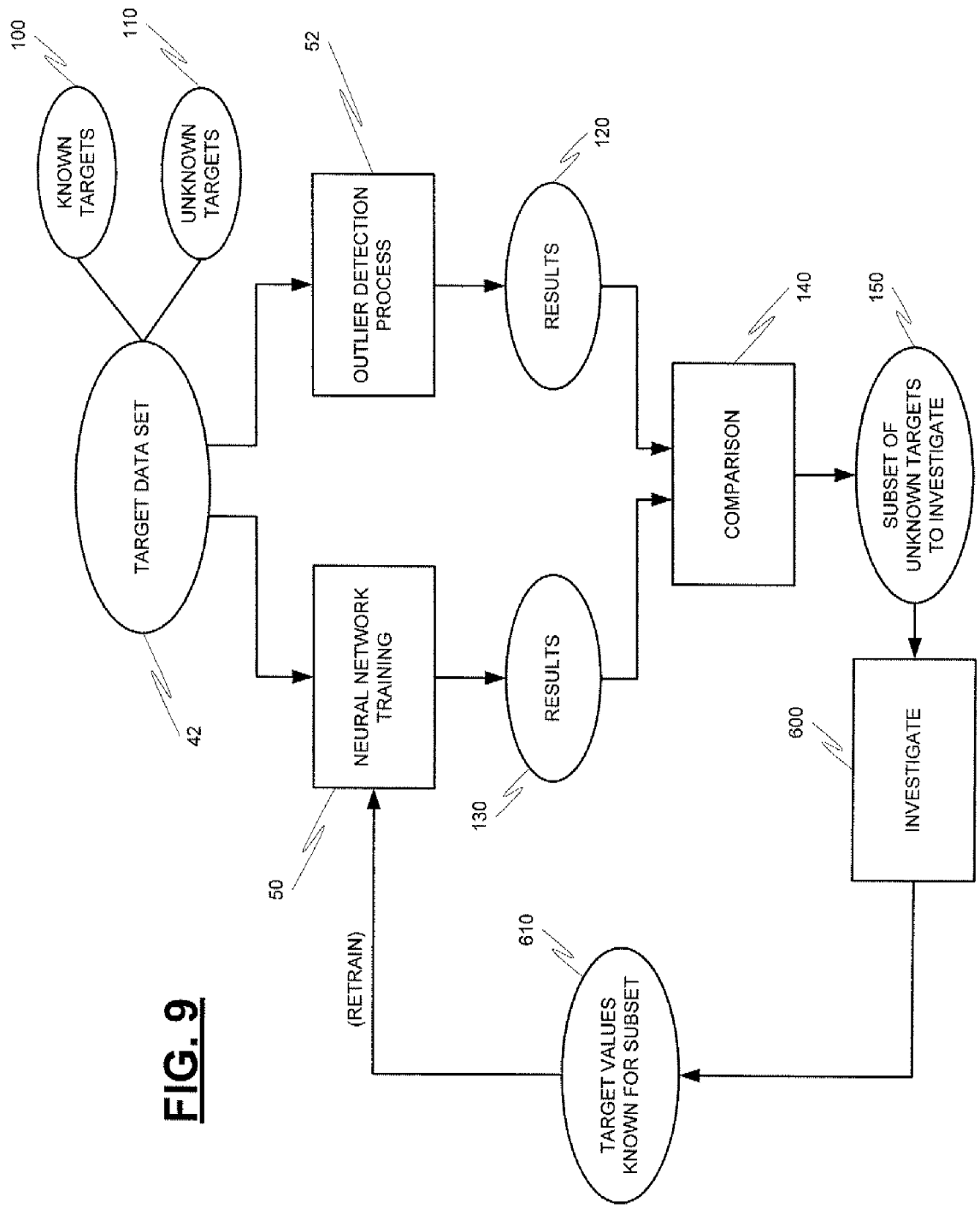
FIG. 9 is a process flow diagram depicting an iterative training process for improving a neural network model.

FIG. 9 depicts that an iterative training process can be employed for improving the neural network training. For example, after the subset 150 of unknown targets to investigate has been established, process 600 can investigate the true status or values of the unknown targets in the subset 150.

The investigation process 600 is resource efficient because the investigation (at this stage) only needs to focus on the subset 150 and not the entire (and potentially large) corpus of unknown targets. As an example of process 600, analyzing the subset 150 can include examination by human analysts of the unknown targets to determine which targets within the data subset 150 constitute anomalous behavior.

In addition to or as a supplement to manual investigation, analysis of the target subset 150 can include examination of the subset 150 by another software program that uses more resource intensive techniques to determine a more accurate set of values for the unknown targets in the subset 150.

In any event, process 600 results in more accurate target values being produced for the data subset 150. The target results are fed into process 50 so that the neural network model can be improved which results in more accurate results 130 for use by the comparison process 140 in subsequent iterations.

Figure 10:
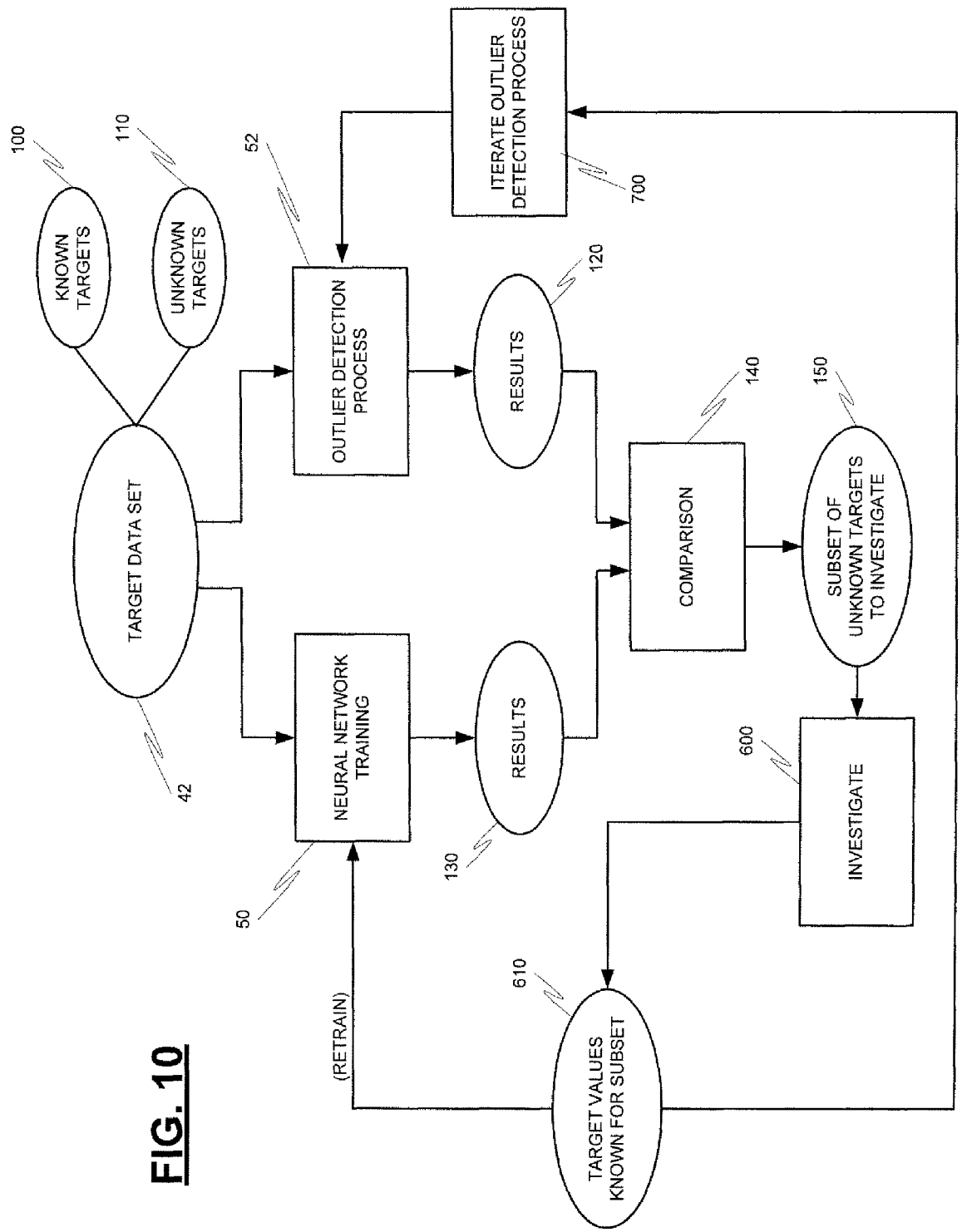
FIG. 10 is a process flow diagram depicting an iterative training process for improving an outlier detection process.

FIG. 10 illustrates then the retraining process can also be applied to the outlier detection process 52. After process 600 has investigated the subset 150 of unknown targets and ascertained the true values for the subset 150, these target values 610 can be made available to improve at 700 the outlier detection process. The nonlinear replicator neural network that was used in the outlier detection process 52 can be improved by training the model based upon the target values that are now known for the subset.

Figure 11:
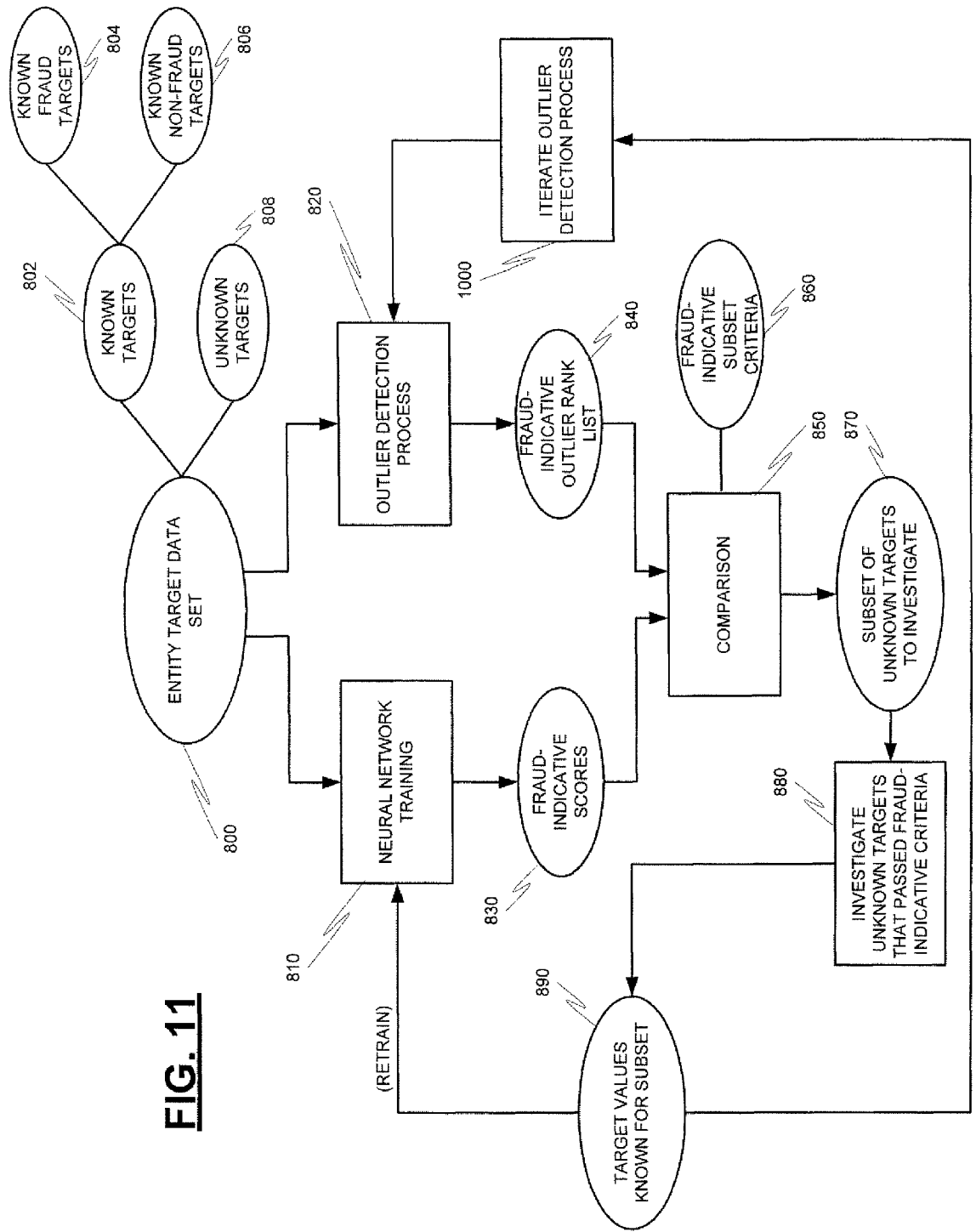
FIG. 11 is a process flow diagram depicting a system for analyzing financial or monetary type activities with respect to whether fraud may have occurred.

The predictive model construction approaches described herein can be utilized for many different purposes where target values are unknown. For example, predictive models can be constructed in order to analyze whether fraud may have occurred with respect to a financial transaction. FIG. 11 depicts a computer-implemented system for analyzing financial or monetary type activities with respect to whether fraud may have occurred (e.g., purchase card fraud or tax evasion fraud).

The target data set 800 includes both known targets 802 and unknown targets 808. The known targets 802 in this example include known fraud targets 804 or instances of fraud (e.g., an entity had filed a false tax return; an entity had used a stolen credit card to purchase an item; etc.) as well as known non-fraud targets (e.g., an entity had filed a correct tax return; an entity had made a legitimate credit card purchase; etc.). In this example, the number of legitimate type targets overwhelmingly outnumbers the known fraud targets. The unknown targets 808 constitute entities, such as individuals or organizations, whose transactions (e.g., filing a tax return; making a credit card purchase; etc.) do not contain an indication of whether fraud has occurred.

As discussed above, the target data set 800 contains only a partial set of known targets (e.g., known targets 802 and unknown targets 808). Process 810 trains a model (e.g., neural network) for predicting values or scores that are indicative of whether fraud has occurred with respect to the known targets 802.

With the input data and the cost function, process 810 generates a neural network model using the known targets 802. The unknown targets 808 are used with the generated neural network model to generate values (i.e., fraud-indicative scores 830) for the unknown targets 808.

An outlier detection process 820 is performed using the target data set 800 in order to determine which of the unknown targets 808 are outliers. An unknown target being identified in the results 840 as an outlier by process 820 is an indication of fraudulent activity. More specifically in this example, the results 840 of the outlier detection process 820 can be a rank order list. The rank order list contains the unknown targets that were determined to be outliers ordered by the error amount that they exhibited from the compression and uncompression processes. The unknown targets exhibiting a higher amount of error are considered more likely to involve fraudulent activity than the unknown targets that exhibit a smaller amount of error.

Process 850 performs a comparison between the list of unknown targets (that have been identified as outliers) and the scores 830 for the unknown targets that were generated by the neural network model. The subset 870 of unknown targets to investigate is determined based upon the comparison by process 850.

Process 850 compares the fraud-indicative scores 830 from the neural network with the rank order list from the outlier detection process 820. The comparison process 850 uses subset criteria 860 in determining which of the unknown targets should be included in the subset 870 of unknown targets to investigate. In this example, the subset criteria 870 specifies that the subset 860 should include only those unknown targets that have a relatively high score as determined by the neural network model as well as those that were highly ranked as outliers by the outlier detection process.

Process 880 performs an investigation of the unknown targets that passed the fraud-indicative criteria 860. As a result of the investigation 880, the true target values become known for the subset 870 and are used to retrain the neural network at 810. The retrained neural network is then applied to the remaining unknown targets in the target data set 800 in order to generate new fraud indicative scores.

Similarly, the target values 890 that are known for the subset 870 can also be used to refine the outlier detection process as indicated in 1000. The improved outlier detection process 820 performs outlier detection upon the remaining unknown targets 808 in order to produce a new fraud-indicative outlier list. Process 850 then uses the new fraud-indicative scores as well as the new fraud-indicative scores generated by process 810 when it is to perform its comparison operations. Process 850 results in a new subset of unknown targets to investigate. The investigation and retraining operations can continue until the models have reached a particular level of precision and/or until no more investigations are desired.

Figure 12:
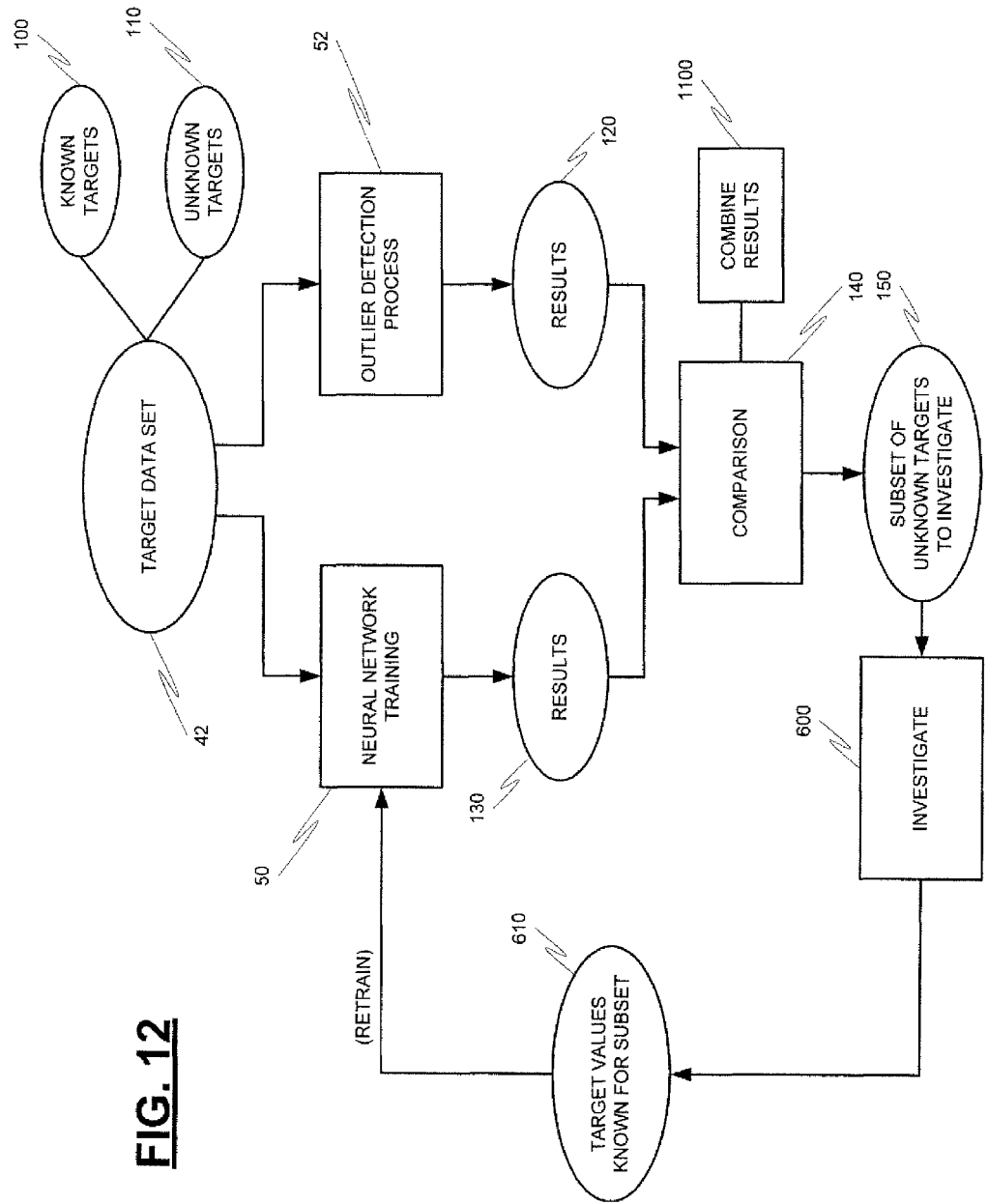
FIG. 12 is a process flow diagram depicting the combination of results from a neural network model with results from an outlier detection process.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, FIG. 12 shows that the results 120 and 130 that are respectively generated via a processes 52 and 50 can be combined by process 1100. The combination of the results can be used to construct a more robust overall predictive model to determine whether an event or activity constitutes anomalous behavior. More specifically, the combination of the results can be achieved through optimizing the contributions of the results from processes 50 and 52 to the final overall model in terms of the model performance on known target data set.

As another illustration, the systems and methods disclosed herein could use different types of models as supervised models and unsupervised models. For example, linear regression models and logistic regression models can be used as supervised models in the disclosed operational scenarios; and principal component analysis type models can be used as unsupervised models in the disclosed operational scenarios.

Figure 13:
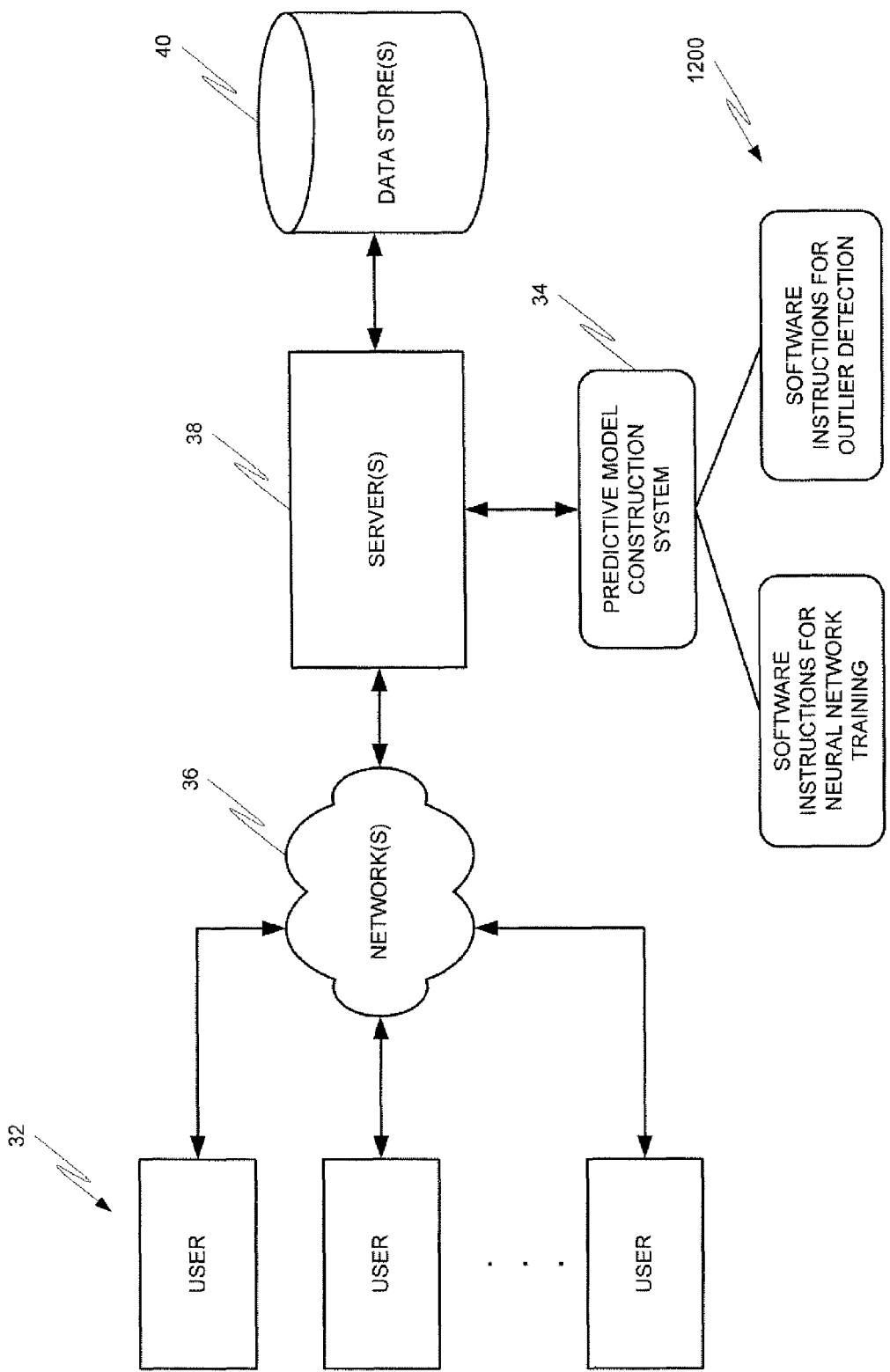
FIG. 13 is a block diagram depicting a networked environment wherein users can interact with a predictive model construction system.

As yet another illustration, the systems and methods disclosed herein may be implemented on various types of computer architectures, such as for example on a networked system, on a single general purpose computer, etc. For example, FIG. 13 depicts a networked environment wherein users 32 can interact with a predictive model construction system 34. The same server or different servers can contain various software instructions 1200 (e.g., software instructions for neural network training, software instructions for outlier detection, etc.) or modules of the predictive model construction system 34. Data store(s) 40 can store the data to be analyzed as well as any intermediate or final data calculations and data results of such software instructions or modules.

Figure 14:
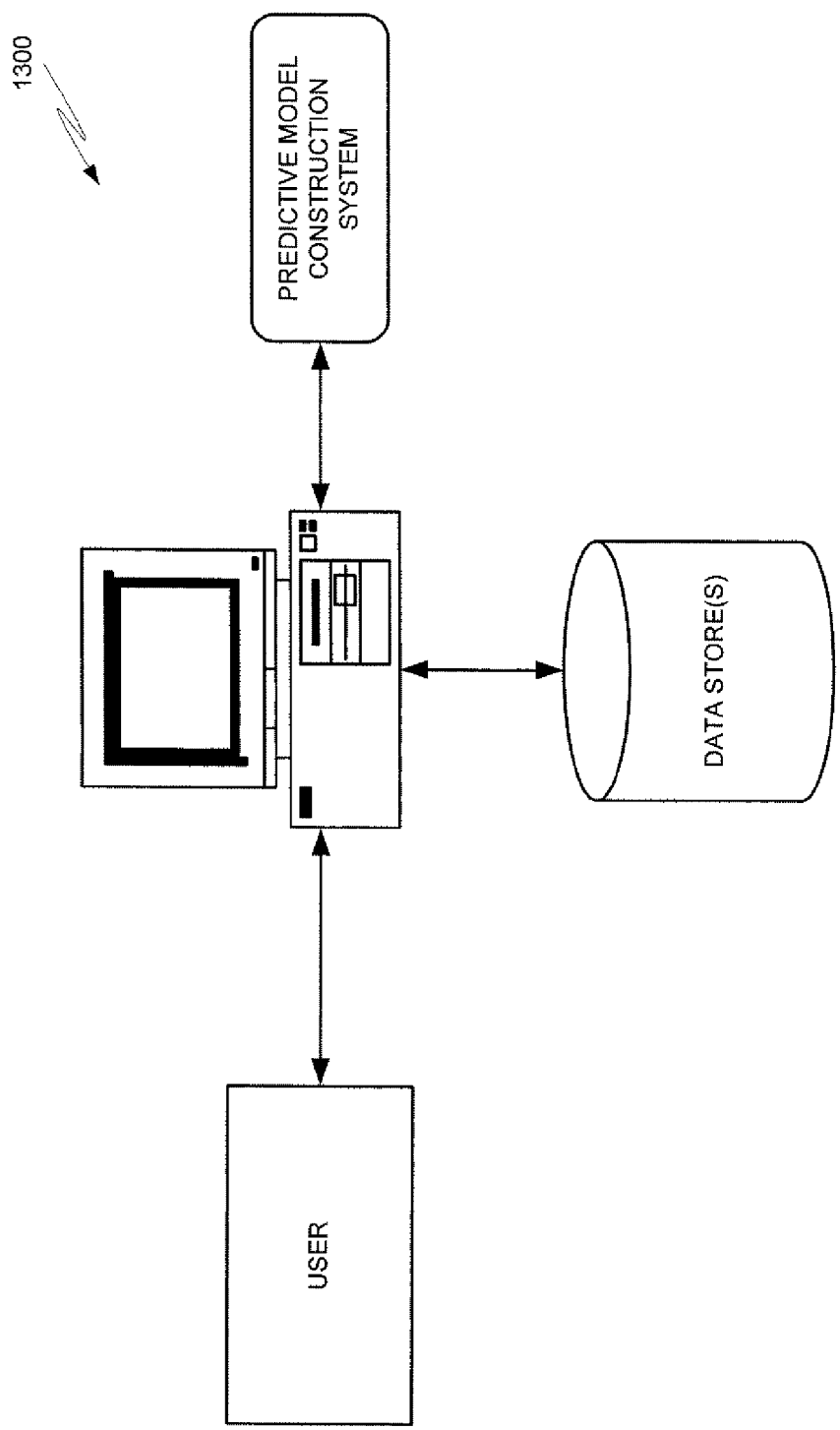
FIG. 14 is a block diagram depicting a stand-alone computer environment wherein a user can interact with a predictive model construction system.

It should be understood that the analytical systems described herein (e.g., tax fraud analysis system, purchase card fraud analysis system, etc.) can be implemented in other ways, such as on a stand-alone computer for access by a user as shown at 1300 in FIG. 14.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A processor-implemented method for determining unknown targets to investigate, comprising:
   receiving, using one or more processors, a target data set that includes known targets and unknown targets;
   generating, using the one or more processors, a neural network model using the known targets, wherein generating includes training the neural network model using the known targets;

using the neural network model to score the unknown targets in the target data set to generate unknown target scores, wherein scoring is performed using the one or more processors;

determining, using the one or more processors, a neural network target set, wherein the neural network target set contains unknown targets having unknown target scores that meet a threshold;

performing, using the one or more processors, outlier detection analysis on the unknown targets in the target data set to determine a sorted list of outlier unknown targets, wherein the sorted list is sorted according to an outlying degree;

determining, using the one or more processors, an outlier detection target set, wherein the outlier detection target set includes a portion of the unknown targets in the sorted list, and wherein inclusion in the portion is based upon the outlying degree;

determining, using the one or more processors, a subset of unknown targets to investigate, wherein the subset of unknown targets to investigate contains unknown targets that appear in both the neural network target set and the outlier detection target set;

applying, using the one or more processors, labels to the unknown targets in the subset based upon an investigative analysis;

retraining, using the one or more processors, the neural network model using the labeled unknown targets; and using the retrained neural network model and the outlier detection analysis to determine a new subset of unknown targets to investigate, wherein determining the new subset is performed using the one or more processors.

2. The method of claim 1, wherein the target data set includes one or more fraudulent entities or transactions to investigate.

3. The method of claim 2, wherein the unknown target scores are scores that indicate whether fraud has occurred.

4. The method of claim 1, wherein performing the outlier detection analysis includes:
   compressing, using the one or more processors, one or more unknown targets into a lower dimensional representation;
   uncompressing, using the one or more processors, the one or more unknown targets into a higher dimensional representation; and
   determining, using the one or more processors, that one of the unknown targets is an outlier based upon a compression/uncompression error.

5. The method of claim 4, wherein compressing includes using a compression neural network.

6. The method of claim 1, wherein performing the outlier detection analysis includes using a nonlinear replicator neural network.

7. The method of claim 1, wherein when the subset of unknown targets are investigated they become newly known targets.

8. The method of claim 1, wherein the outlier unknown targets are identified as possibly anomalous.

9. The method of claim 8, wherein the outlier unknown targets are identified as possibly fraudulent activity.

10. The method of claim 1, wherein the target data set includes transaction data.

11. The method of claim 10, wherein one or more of the known targets in the target data set is labeled as a fraudulent transaction.

12. A system for determining unknown targets to investigate, comprising:
    one or more processors;
    a computer-readable storage medium containing instructions configured to cause the one or more processors to perform operations, including:
    receiving a target data set that includes known targets and unknown targets;
    generating a neural network model using the known targets, wherein generating includes training the neural network model using the known targets;
    using the neural network model to score the unknown targets in the target data set to generate unknown target scores;
    determining a neural network target set, wherein the neural network target set contains unknown targets having unknown target scores that meet a threshold;
    performing outlier detection analysis on the unknown targets in the target data set to determine a sorted list of outlier unknown targets, wherein the sorted list is sorted according to an outlying degree;
    determining an outlier detection target set, wherein the outlier detection target set includes a portion of the unknown targets in the sorted list, and wherein inclusion in the portion is based upon the outlying degree;
    determining a subset of unknown targets to investigate, wherein the subset of unknown targets to investigate contains unknown targets that appear in both the neural network target set and the outlier detection target set;
    applying labels to the unknown targets in the subset based upon an investigative analysis;
    retraining the neural network model using the labeled unknown targets; and
    using the retrained neural network model and the outlier detection analysis to determine a new subset of unknown targets to investigate.

13. A computer-program product, tangibly embodied in a non-transitory machine-readable storage medium, including instructions configured to cause a data processing apparatus to:
    receive a target data set that includes known targets and unknown targets;
    generate a neural network model using the known targets, wherein generating includes training the neural network model using the known targets;
    use the neural network model to score the unknown targets in the target data set to generate unknown target scores;
    determine a neural network target set, wherein the neural network target set contains unknown targets having unknown target scores that meet a threshold;
    perform outlier detection analysis on the unknown targets in the target data set to determine a sorted list of outlier unknown targets, wherein the sorted list is sorted according to an outlying degree;
    determine an outlier detection target set, wherein the outlier detection target set includes a portion of the unknown targets in the sorted list, and wherein inclusion in the portion is based upon the outlying degree;
    determine a subset of unknown targets to investigate, wherein the subset of unknown targets to investigate contains unknown targets that appear in both the neural network target set and the outlier detection target set;
    apply labels to the unknown targets in the subset based upon an investigative analysis;
    retrain the neural network model using the labeled unknown targets; and
    use the retrained neural network model and the outlier detection analysis to determine a new subset of unknown targets to investigate.

* * * * *